United States Patent [19]

Kogure et al.

[11] Patent Number: 5,188,750
[45] Date of Patent: Feb. 23, 1993

[54] ANTI-ICING COMPOSITION AND METHOD OF PREVENTING ICING

[75] Inventors: Hideo Kogure, Atsugi; Heihachi Murase, Kanagawa; Koichi Tamura, Hiratsuka, all of Japan

[73] Assignee: Kansai Paint Company, Limited, Amagasaki, Japan

[21] Appl. No.: 790,088

[22] Filed: Nov. 13, 1991

Related U.S. Application Data

[63] Continuation of Ser. No. 442,048, Nov. 28, 1989, abandoned.

[30] Foreign Application Priority Data

Nov. 29, 1988 [JP] Japan .................................. 63-303507

[51] Int. Cl.$^5$ ................................................ C09K 3/18
[52] U.S. Cl. ........................................ 252/70; 106/13
[58] Field of Search ............................. 252/70; 106/13

[56] References Cited

U.S. PATENT DOCUMENTS

| 3,933,407 | 1/1976 | Tu et al. | 106/13 |
| 4,636,324 | 1/1987 | Murase et al. | 106/13 |
| 4,708,743 | 11/1987 | Schmidt | 106/13 |
| 4,774,112 | 9/1988 | Achtenberg et al. | 252/70 |
| 4,927,668 | 5/1990 | Senchowski | 106/13 |
| 5,035,934 | 7/1991 | Tomiyama et al. | 106/13 |

FOREIGN PATENT DOCUMENTS

| 0257720 | 8/1987 | European Pat. Off. |
| WO88/08018 | 10/1988 | PCT Int'l Appl. |
| 8808018 | 10/1988 | World Int. Prop. O. |

Primary Examiner—A. Lionel Clingman
Assistant Examiner—William S. Parks
Attorney, Agent, or Firm—Armstrong, Westerman, Hattori, McLeland & Naughton

[57] ABSTRACT

This invention provides:
(A) an anti-icing composition comprising a silicone resin which is at least one condensate selected from the group consisting of:

(i) a condensate of an alkoxydimethylsiloxane compound represented by the formula

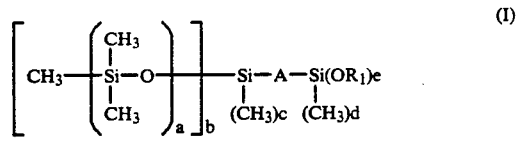

(I)

wherein $R_1$ *l is a methyl group or an ethyl group, A is an oxygen atom, an ethylene group or a 1,3-propylene group, a is an integer of 5 to 150, b and e are different or the same and each represent an integer of 1 to 3, c is an integer of 3-b and d is an integer of 3-e,*

(ii) a condensate of the compound of the formula (I) and an alkoxysilane compound represented by the formula $$(R_3)h-Si-(OR_2)j \qquad (II)$$

wherein $R_2$ is a methyl group or an ethyl group, $R_3$ is an alkyl group having 1 to 8 carbon atoms, h is an integer of 0 to 3 and j is an integer of 4-h, (iii) a condensate of the compound of the formula (I) and a dihydroxydimethylsiloxane compound represented by the formula

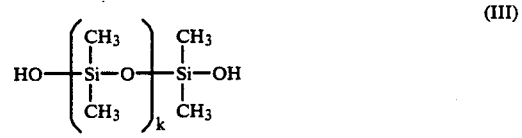

(III)

wherein k is an integer of 10 to 200, and (iv) a condensate of the compound of the formula (I), the alkoxysilane compound of the formula (II) and the dihydroxydimethylsiloxane compound of the formula (III); and (B) a method of preventing icing which comprises applying to an article an aerosol comprising the foregoing anti-icing composition and a propellant.

7 Claims, No Drawings

ANTI-ICING COMPOSITION AND METHOD OF PREVENTING ICING

This application is a continuation of application Ser. No. 442,048 filed Nov. 28, 1989, now abandoned.

The present invention relates to a novel anti-icing composition and a novel method of preventing icing.

Ice-thawing agents are commercially available which comprise an ethylene glycol or like alcohol, a surfactant, a propellant such as carbon dioxide gas or LPG and the like. In use, such ice-thawing agent is sprayed to temporarily thaw the ice on an article as on portions of automobiles such as windshield glass, wiper, mirror, tire housing, keyholes and the like.

However, these commercially available ice-thawing agents are intended to temporarily thaw the ice on an article and are unable to sustain the effect. Further the ice-thawing agent applied to an article can not prevent icing thereon. Generally an ice coating formed on an article exhibits an icing strength of less than about 1 kg/cm² when forcedly separated from the article without use of a spatula, hammer, stick or the like. On the other hand, the portion of the ice-thawing agent sprayed and left on an article shows an icing strength of over 1 kg/cm² when frozen into ice. In other words, the commercial ice-thawing agent has the further drawback of being formed into ice having a higher icing strength unless the active component in the agent is completely removed by thoroughly washing the sprayed agent with water.

Japanese Unexamined Patent Publication No.185776/1987 discloses a defrosting and anti-icing composition comprising a homopolymer of glycol, acrylic acid or alkali metal acrylate, an acrylamide/acrylic acid copolymer or an acrylamide/alkali metal acrylate copolymer, an alkali metal alkylarylsulfonate, a corrosion inhibitor, three kinds of basic compounds for adjusting the pH and water. The disclosed composition is effective in defrosting or preventing icing on an article subjected to shear force as on aircraft taking off, but is unsatisfactory in removing ice or preventing icing on a stationary article.

It is an object of the present invention to provide a novel anti-icing composition which is formed into ice with an icing strength of up to about 1 kg/cm² and which is capable of easily removing ice, and a method of preventing icing with the composition.

It is another object of the invention to provide a novel anti-icing composition which can sustain an excellent anti-icing effect over a prolonged period, and a method of preventing icing with the composition.

These and other objects of the invention will become apparent from the following description.

According to the present invention, there is provided an anti-icing composition comprising a silicone resin which is at least one condensate selected from the group consisting of:
(i) a condensate of an alkoxydimethylsiloxane compound represented by the formula

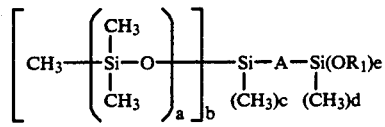

wherein $R_1$ is a methyl group or an ethyl group, A is an oxygen atom, an ethylene group or a 1,3-propylene group, a is an integer of 5 to 150, b and e are different or the same and each represent an integer of 1 to 3, c is an integer of 3-b and d is an integer of 3-e, (ii) a condensate of the compound of the formula (I) and an alkoxysilane compound represented by the formula

wherein $R_2$ is a methyl group or an ethyl group, $R_3$ is an alkyl group having 1 to 8 carbon atoms, h is an integer of 0 to 3 and j is an integer of 4-h, (iii) a condensate of the compound of the formula (I) and a dihydroxydimethylsiloxane compound represented by the formula

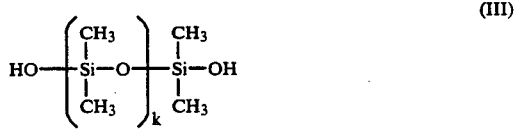

wherein k is an integer of 10 to 200, and
(iv) a condensate of the compound of the formula (I), the alkoxysilane compound of the formula (II) and the dihydroxydimethylsiloxane compound of the formula (III).

These silicone resins (i) to (iv) will be hereinafter referred to each as "condensation silicone resin".

According to the invention, there is also provided an anti-icing composition comprising the condensation silicone resin and a moisture-curable film-forming resin.

According to the invention, there is further provided a method of preventing icing which comprises applying onto an article an aerosol containing the anti-icing composition and a propellant.

Concentrating on the specific properties of dimethylpolysiloxane (silicone oil) of being hydrophobic and having low surface energy, we investigated and found that with a low cohesive strength, the silicone oil is removed together with ice and is unable to sustain its low icing strength. Then we conducted extensive research on anti-icing compositions prepared utilizing the advantage of low icing strength due to dimethylpolysiloxane chains and capable of being formed into ice retaining a low icing strength. Our research revealed that a composition containing a condensation product prepared from a specific alkoxydimethylsiloxane compound can achieve the foregoing objects.

The present invention has been accomplished on the basis of this novel finding.

The condensation silicone resin for use in the invention is at least one condensate selected from (i) the condensate of the alkoxydimethylsiloxane compound of the formula (I) (hereinafter referred to as "compound (I)"), (ii) the condensate of the compound (I) and the alkoxysilane compound of the formula (II), (iii) the condensate of the compound (I) and the dihydroxydimethylsiloxane compound of the formula (III) and (iv) the condensate of the compound (I), the alkoxysilane of the formula (II) and the dihydroxydimethylsiloxane of the formula (III). These condensation siloxane resins predominantly contain hydrophobic dimethylsiloxane chains and are preferably comb-shaped condensates having hydrophobic dimethylsiloxane chains as the side chains.

The condensates (i) and (ii) are prepared by partially hydrolytic condensation or co-condensation reaction. The reaction for forming the condensate (ii) is typically illustrated by the following reaction scheme.

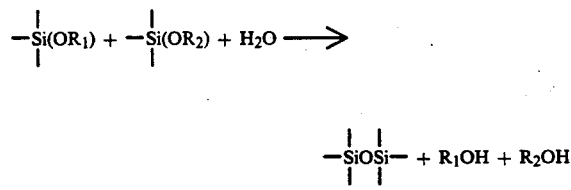

The condensates (iii) and (iv) can be prepared by the same method as above, i.e. by partially hydrolytic cocondensation reaction, and can be optionally prepared without hydrolysis. For example, the condensate (iii) is obtained according to the following reaction scheme.

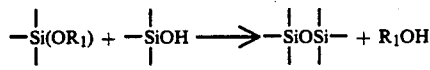

In the reaction between the compound (I) and the alkoxysilane of the formula (II) for giving the condensate (ii), it is preferred to use about 30% by weight or less of the alkoxysilane of the formula (II) based on the combined amount of both compounds. If over 30% by weight of the alkoxysilane of the formula (II) is used, the alkoxy group as the polar group or the hydrolyzed silanol group readily remain, resulting in increase of icing strength.

In the reaction between the compound (I) and the dihydroxydimethylsiloxane of the formula (III) for giving the condensate (iii), the dihydroxydimethylsiloxane of the formula (III) is used in an amount of preferably about 80% by weight or less, more preferably about 20 to about 70% by weight, based on the combined amount of both compounds. If more than 80% by weight of the dihydroxydimethylsiloxane of the formula (III) is used, the unreacted silanol group readily remains in large quantity, leading to increase of icing strength.

In the reaction for providing the condensate (iv), it is suitable to use about 20% by weight or more, preferably about 30 to about 70% by weight, of the compound (I); about 30% by weight or less, preferably about 20% by weight or less of the alkoxysilane of the formula (II); and about 80% by weight or less, preferably about 30 to about 70% by weight, of the dihydroxydimethylsiloxane of the formula (III), all based on the combined amount of the three compounds.

With less than 20% by weight of the compound (I) used, the amount of hydrophobic polydimethylsiloxane chains as the side chains is reduced, resulting in increase of icing strength.

With more than 30% by weight of the alkoxysilane of the formula (II) used, the alkoxy group and the hydrolyzed silanol group both as polar groups readily remain, causing the increase of icing strength.

With over 80% by weight of the dihydroxydimethylsiloxane of the formula (III) used, the unreacted silanol group readily remains in large amount, leading to increase of icing strength.

According to the invention, the condensation silicone resin for the composition of the invention is prepared by condensing at least one compound (I), or by co-condensing the compound (I), the alkoxysilane of the formula (II) and/or the dihydroxydimethylsiloxane of the formula (III). For the preparation of the condensation silicone resin, it is desirable to suitably select the kind of starting materials, mixing ratio, kind of reaction catalyst, amount of catalyst, reaction temperature and reaction time so that the resulting condensation silicone resin has a weight average molecular weight of about 15,000 to about 200,000, preferably about 20,000 to about 150,000. Examples of useful reaction catalysts are mineral acids such as hydrochloric acid, sulfuric acid and the like; organic acids such as formic acid, acetic acid and the like; acetylacetone complexes of manganese, cobalt, lead, nickel, iron, tin, zinc or like metals; stearic acid salt, octylic acid salt or like fatty acid salts of the above-mentioned metals; etc. The reaction catalyst is used usually in an amount of about 0.001 to about 1 part by weight per 100 parts by weight of the silicone compounds of the formulas (I) to (III) as combined. The condensation reaction is carried out at a temperature of about 50 to about 150° C for about 30 minutes to about 10 hours.

According to the invention, the condensation silicone resin is used singly or in mixture with an organic solvent, or preferably in mixture with a moisturecurable film-forming resin to give a film with improved strength and a higher adhesion to the substrate, consequently with an enhanced ability to sustain the antiicing effect for a long term.

A suitable ratio of the condensation silicone resin and the moisture-curable film-forming resin is about 2% by weight or more, preferably about 5 to about 95% by weight, of the former and about 98% by weight or less, preferably about 95 to about 5% by weight, of the latter, based on the combined amount of the two components. Use of below 2% by weight of the condensation silicone resin (i.e. above 98% by weight of the moisture-curable film-forming resin) is likely to increase the icing strength, hence undesirable.

A proper moisture-curable film-forming resin for use in the invention is a resin having a silicon group represented by the formula

wherein $R_5$ is a hydrocarbon group of 1 to 10 carbon atoms selected from an alkyl group, an aryl group and an aralkyl group, Z is a hydrolyzable group selected from a halogen atom, an alkoxy group, an acyloxy group, a phenoxy group and a thioalkoxy group and t is an integer of 1 to 3, the resin having per molecule at least one silicon group, preferably about 2 to about 1,200 silicon groups, attached to the hydrolyzable group or groups at the terminal or side chain. The presence of hydrolyzable group renders the resin moisture-curable.

Silicon groups having hydrolyzable groups are introduced into the resin by (a) effecting a hydrosilyl-forming reaction between a resin having polymerizable carbon-carbon double bond and a hydrosilane compound represented by the formula

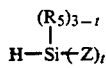

wherein $R_5$, Z and t are as defined above in the presence of a VIII group transition metal catalyst, or (b) subjecting to radical copolymerization a polymerizable unsaturated compound and a silane compound represented by the formula

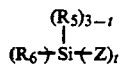

wherein $R_6$ is an organic residue having polymerizable carbon-carbon double bond, and $R_5$, Z and t are as defined above.

Examples of hydrosilane compounds useful in the method (a) are methyldichlorosilane, trichlorosilane, phenyldichlorosilane and like halogenated hydrosilanes; methyldiethoxysilane, methyldimethoxysilane, phenyldimethoxysilane, trimethoxysilane, triethoxysilane and like alkoxyhydrosilanes; and methyldiacetoxyhydrosilane, phenyldiacetoxysilane, triacetoxysilane and like acyloxyhydrosilanes.

Among these hydrosilane compounds, halogenated hydrosilane compounds, which are capable of easily reacting, give a resin which is preferably treated to introduce therein other hydrolyzable functional group replacing the halogen group because the resin containing a halogenated silicon group as hydrolyzable group is useful only for limited applications in view of the problems that the hydrogen chloride given off on exposure to air will emit an irritating odor and cause corrosion.

Examples of resins having polymerizable carbon-carbon double bond which can be used in the method (a) are vinyl-type resins, polyester-type resins, polybutadiene-type resins, urethane-type resins and the like.

Useful vinyl-type resins consist essentially of a copolymer of monomers such as methyl acrylate or methacrylate, ethyl acrylate or methacrylate, propyl acrylate or methacrylate, n-butyl acrylate or methacrylate, i-butyl acrylate or methacrylate, t-butyl acrylate or methacrylate, 2-ethylhexyl acrylate or methacrylate, cyclohexyl acrylate or methacrylate, n-octyl acrylate or methacrylate, lauryl acrylate or methacrylate, benzyl acrylate or methacrylate and like esters of acrylic or methacrylic acids; styrene, $\alpha$-methylstyrene, vinyltoluene, p-chlorostyrene, p-t-butylstyrene and like vinyl aromatic compounds; acrylic or methacrylic acid, crotonic acid, fumaric acid, maleic anhydride or acid, itaconic anhydride or acid and like unsaturated carboxylic acids; glycidyl acrylate or methacrylate, vinyl glycidyl ether, allylglycidyl ether and like glycidyl-containing vinyl compounds; vinyl acetate, vinyl benzoate, "VEOVA" (trademark, product of Shell Chemical Co.) and like vinyl esters; acrylonitrile or methacrylonitrile and like cyano-containing monomers; N,N-dimethylaminoethyl acrylate or methacrylate, N,N-diethylaminoethyl acrylate or methacrylate and like N,N-dialkylaminoalkyl acrylate- or methacrylate-type tertiary amino-containing monomers; n-butyl vinyl ether, ethyl vinyl ether, methyl vinyl ether and like vinyl monomers; etc.

Allyl groups as polymerizable carbon-carbon double bonds may be introduced into the copolymer by radical copolymerization using allyl acrylate or methacrylate and an azo-type polymerization initiator. Polymerizable double bonds may be also introduced into the copolymer by copolymerizing 2-hydroxyethyl acrylate or methacrylate or like hydroxyl-containing polymerizable unsaturated compounds with the above monomer to react the hydroxyl group with an adduct of isophorone diisocyanate or tolylene diisocyanate with hydroxy acrylate or methacrylate (1/1 molar ratio); isocyanoethyl acrylate or methacrylate, m-isopropenyl-$\alpha,\alpha'$-dimethyl benzyl isocyanate or like isocyanate-containing polymerizable unsaturated compound. Optionally allyl groups may be introduced into the copolymer by incorporating isocyanate groups into the copolymer and reacting the isocyanate groups with the hydroxyl-containing polymerizable unsaturated compound. As a further option, polymerizable double bonds may be introduced into the copolymer utilizing the ability of functional groups to react with each other, e.g. reacting hydroxyl groups with carboxyl groups, reacting hydroxyl groups with acid anhydride groups, instead of reacting the isocyanate groups with the hydroxyl groups.

The polyester-type resin for use in the method (a) predominantly contains a polyester resin prepared by condensing an organic acid component and an alcohol component which are commonly employed in preparation of polyester resins. Usually polybasic acids can be used as the organic acid component. Examples of useful polybasic acids are phthalic acid, isophthalic acid, terephthalic acid, tetrahydrophthalic acid, tetrahydroterephthalic acid, hexahydrophthalic acid, hexahydroisophthalic acid, hexahydroterephthalic acid, HET acid (chlorendic acid), trimellitic acid, hexahydrotrimellitic acid, pyromellitic acid, cyclohexanetetracarboxylic acid, methyltetrahydrophthalic acid, methylhexahydrophthalic acid, endometylenehexahydrophthalic acid, methylendomethylenetetrahydrophthalic acid, maleic acid, fumaric acid, itaconic acid, succinic acid, glutaric acid, adipic acid, azelaic acid, sebacic acid, decanedicarboxylic acid, suberic acid, pimelic acid, dimer acid (dimer of tall oil fatty acid), tetrachlorophthalic acid, naphthalenedicarboxylic acid, 4,4'-diphenylmethanedicarboxylic acid, 4,4'-dicarboxybiphenyl and the like, anhydrides thereof, dialkyl esters thereof, especially dimethyl esters thereof and the like.

Dihydric and trihydric alcohols are usually used as the alcohol component. Examples of useful dihydric alcohols are ethylene glycol, propylene glycol, 1,4-butanediol, 1,3-butanediol, 2,3-butanediol, 1,2-butanediol, 1,5-pentanediol, 1,4-pentanediol, 2,4-pentanediol, 2,3-dimethyltrimethylene glycol, 3-methyl-1,5-pentane-diol, 3-methyl-4,5-pentanediol, 2,2,4-trimethyl-1,3-pentanediol, 1,6-hexanediol, 1,5-hexanediol, 1,4-hexanediol, 2,5-hexanediol, 1,4-cyclohexanedimethanol, diethylene glycol, dipropylene glycol, triethylene glycol, neopentyl glycol, hydroxypivalic acid, neopentyl glycol ester, polyalkylene oxide, bishydroxyethylterephthalate, adduct of hydrogenated bisphenol A or bisphenol A with alkylene oxide and the like. Monoepoxy compounds such as Cardula E10 (trademark, product of Shell Chemical Co.), $\alpha$-olefin epoxide, butylene oxide and the like can be also used as a kind of glycol. Examples of useful trihydric or polyhydric alcohols are glycerin, trimetylolpropane, trimethylolethane, diglycerin, pentaerythritol, dipentaerythritol, sorbitol and the like.

Also usable are compounds having both carboxylic acid and hydroxyl group in the molecule. Examples of such compounds are dimethylolpropionic acid, pivalic acid, 12-hydroxystearic acid, ricinoleic acid, etc. Lactones such as ε-caprolactone, γ-valerolactone, etc. are usable as well.

The organic acid component and the alcohol component are partially replaced by natural or synthetic higher fatty acid, higher alcohol, 2-hydroxyethyl acrylate, 2-hydroxyethyl methacrylate, acrylic acid, methacrylic acid, benzoic acid, p-t-butyl benzoate and like monofunctional compounds or natural oil.

Polymerizable double bonds may be introduced into the resin by using the organic acid component and alcohol component containing polymerizable unsaturated group. As another option, when the polyester resin prepared by condensing the organic acid component and the alcohol component contains hydroxyl group, introduction of polymerizable double bonds can be performed by reacting the hydroxyl group with the isocyanate-containing polymerizable unsaturated compound or by reacting the hydroxyl group with a polymerizable unsaturated compound having carboxyl group or acid anhydride group. On the other hand, when the polyester resin contains carboxyl group, the introduction of polymerizable double bond can be done by reacting carboxyl group with a polymerizable unsaturated compound having hydroxyl group in less than equivalent amount relative to the carboxyl group.

In the method (a), a transition metal complex needs to be used as a catalyst in the reaction of the hydrosilane compound with the polymerizable double bond. Effectively usable as the transition metal complex catalyst is a VIII group transition metal complex compound selected from platinum, rhodium, cobalt, palladium and nickel. The reaction of the hydrosilane compound with the polymerizable double bond is conducted at a temperature of about 50 to about 150° C. for about 1 to about 10 hours.

The amount of hydrosilane compound used in the reaction is preferably 0.5 to 2 moles relative to the carbon-carbon double bond present in the vinyl-type resin. The amount of hydrosilane compound may exceed the range, but an excess thereof only results in recovery of the surplus as the unreacted hydrosilane.

Examples of silane compounds useful in the method (b) are γ-acryloyloxypropylmethyldimethoxysilane, γ-acryloyloxypropyltrimethoxysilane, γ-acryloyloxypropylmethyldichlorosilane, γ-acryloyloxypropyltrichlorosilane, γ-methacryloyloxypropylmethyldimethoxysilane, γ-methaoryloyloxypropyltrimethoxysilane,

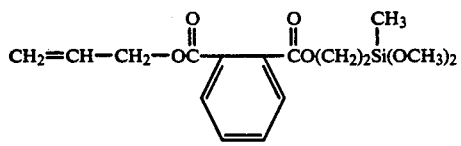

and

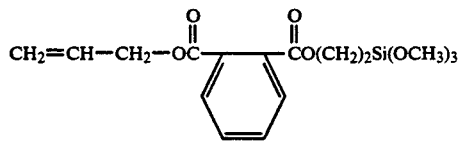

Vinyl monomers usable for synthesis of the copolymer which is the main component of the vinyl-type resin in the method (a) are also usable as the polymerizable unsaturated compound to be copolymerized with the silane compound in the method (b).

The copolymer of vinyl monomer and silane compound can be synthesized by usual solution polymerization method using a vinyl monomer, silane compound, radical polymerization initiator and, when required, n-dodecylmercaptan, t-dodecylmercaptan or like chain transfer agent which assists to give a silylcontaining copolymer of suitable molecular weight. The polymerization is effected at a temperature of about 50 to about 150° C. with or without a solvent. Preferred solvents are unreactive ones such as ethers, hydrocarbons, esters of acetic acids, etc.

While not specifically limited in molecular weight, the moisture-curable film-forming resin for use in the invention has a weight average molecular weight of preferably about 3,000 to about 200,000, more preferably about 5,000 to about 100,000.

The hydrolyzable group attached to the silicon atom in the resin prepared by the method (a) or (b) can be replaced by other hydrolyzable group by the conventional method.

When required, in order to accelerate the condensation reaction between the reactive groups of the condensation silicone resin and the moisture-curable film-forming resin and to give a film of increased strength, the composition of the invention containing the condensation silicone resin and the moisture-curable film-forming resin may incorporate therein a dimethylsiloxane compound having alkoxysilyl groups at both terminals and represented by the formula

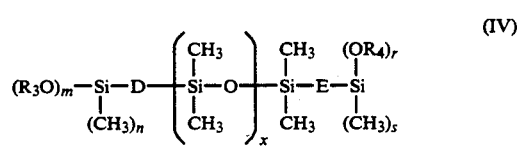

wherein $R_3$ and $R_4$ are the same or different and each represent a methyl group or an ethyl group, D and E are the same or different and each represent an oxygen atom, an ethylene group or a 1,3-propylene group, X is an integer of 3 to 30, m and r are the same or different and each represent an integer of 1 to 3, n is 3-m and S is 3-r. The film formed on an article from the composition comprising the condensation silicone resin and the moisture-curable film-forming resin has the moisture-curable film-forming resin present in the lower film portion (close to the substrate) and the condensation silicone resin present in the upper film portion (close to the atmosphere). The dimethylsiloxane of the formula (IV) incorporated in the composition serves to increase the bonding between these two resins and to enhance the ability to sustain the low icing strength for a long term.

When required, the composition of the invention may further contain a silicone oil represented by the formula

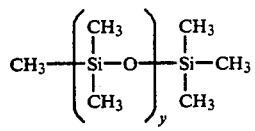

wherein y is an integer of 1 to 20,000. The presence of the silicone oil of the formula (V) in the composition of the invention causes the hydrophobic polydimethylsiloxane chains and the alkyl chains in the condensation silicone resin to orien toward the atmosphere and readily prevents the orientation of highly polar alkoxysilyl groups toward the film surface (close to the atmosphere).

Suitable proportions of condensation silicone resin, moisture-curable film-forming resin, dimethylsiloxane of the formula (IV) and silicone oil of the formula (V) in the composition of the invention are, based on the combined amount of the four components, about 2 to about 100% by weight, preferably about 5 to about 95% by weight, of the condensation silicone resin; about 98% by weight or less, preferably about 3 to about 95% by weight, of the moisture-curable film-forming resin; about 30% by weight or less, preferably about 20% by weight or less, of the dimethylsiloxane of the formula (IV); and about 30% by weight or less, preferably about 20% by weight or less, of the silicone oil of the formula (V). Below 2% by weight of the condensation silicone resin used or above 98% by weight of the moisture-curable film-forming resin used, an increase of icing strength tends to result. Above 30% by weight of the dimethylsiloxane of the formula (IV) used, a large quantity of the unreacted alkoxy group is likely to remain, tending to increase the icing strength. Above 30% by weight of the silicone oil of the formula (V) used, the composition applied to the substrate becomes less curable, tending to readily stain the film surface and to deteriorate the adhesion to the substrate.

The composition of the invention may contain an organic solvent. A spray-type aerosol anti-icing agent which can be conveniently sprayed can be easily produced by filling an organic solvent and a propellant along with the composition into a container and hermetically closing the container. Useful organic solvents are any of those capable of dissolving or dispersing the composition of the invention such as xylene, toluene, methanol, ethanol, isopropanol, n-butanol, isobutanol, ethyl acetate, butyl acetate, methyl ethyl ketone, methyl isobutyl ketone, hexane, heptane, isooctane, ethylene glycol monoethyl ether, ethylene glycol monobutyl ether, ethylene glycol monomethyl ether acetate and the like. Useful propellants include aerosol propellants commonly employed such as liquefied petroleum gas (LPG), liquefied carbon dioxide gas, flon gas, etc. The composition of the invention can be applied as well by brushing or by other spraying method than aerosol application.

The composition of the invention contains the condensation silicone resin having the hydrophobic dimethylsiloxane chains predominantly present. The condensation silicone resin of the invention has a higher anti-icing effect than a silicone oil consisting of straight-chain dimethylsiloxane, and is excellent in anti-icing property, and high in adhesion to the substrate and in ability to sustain the anti-icing property due to the presence of alkoxy group and/or silanol group. Further the composition comprising the moisture-curable film-forming resin and optionally the compound of the formula (IV) as well as the condensation silicone resin gives a film with a higher strength and with a prolonged retention of anti-icing effect.

The present invention will be described below in more detail with reference to the following examples in which the parts and the percentages are all by weight.

PREPARATION OF CONDENSATION SILICONE RESIN SOLUTIONS

PREPARATION EXAMPLE 1

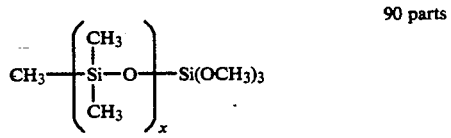

| | |
|---|---|
| | 90 parts |
| wherein x is an integer of about 100 on an average | |
| $CH_3CH_2CH_2—Si(OCH_3)_3$ | 10 parts |
| 0.1N aqueous solution of hydrochloric acid | 4 parts |
| Xylene | 50 parts |
| Methyl isobutyl ketone | 50 parts |

A mixture of the above components was reacted with stirring in a glass reactor at a temperature of 85° C. for 3 hours. The reaction mixture was subjected to condensation at 120° C. for 2 hours while removing the solvent, giving a solution $A_1$ containing a condensation silicone resin with a weight average molecular weight of about 38,000. The solution had a solids content of 67%.

PREPARATION EXAMPLE 2

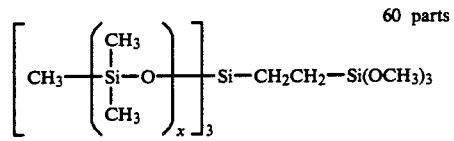

wherein x is an integer of about 10 on an average

| | 40 parts |
|---|---|

(HO—[Si(CH_3)_2—O]_x—Si(CH_3)_2—OH structure shown)

| | |
|---|---|
| wherein x is an integer of about 25 on an average | |
| Tin octylate catalyst | 0.5 part |
| Toluene | 100 parts |

A mixture of the above components was reacted with stirring in a glass reactor at 105° C. for 2 hours. The reaction mixture was subjected to condensation for 2 hours while removing the solvent, giving a solution $A_2$ containing a condensation silicone resin which was about 47,000 in weight average molecular weight. The solution had a solids content of 70%.

PREPARATION EXAMPLE 3

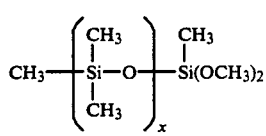
80 parts wherein x is an integer of about 50 on an average

| | |
|---|---|
| CH$_3$—Si(OCH$_3$)$_3$ | 20 parts |
| 0.1N aqueous solution of hydrochloric acid | 4 parts |
| Xylene | 50 parts |
| Methyl isobutyl ketone | 50 parts |

A mixture of the above components was reacted with stirring in a glass reactor at 80° C. for 3 hours. Subsequently the reaction mixture was subjected to condensation at 120° C. for 2 hours while removing the solvent, giving a solution A$_3$ containing a condensation silicone resin with a weight average molecular weight of about 34,000. the solution had a solids content of 62%.

PREPARATION EXAMPLE 4

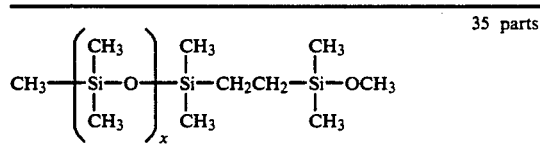
35 parts wherein x is an integer of about 30 on an average

CH$_3$—Si(OCH$_3$)$_3$     15 parts

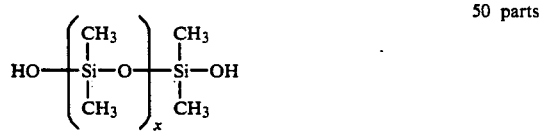
50 parts wherein x is an integer of about 25 on an average

| | |
|---|---|
| Tin octylate catalyst | 0.5 part |
| Toluene | 100 parts |

A mixture of the above components was reacted with stirring in a glass reactor at 105° C. for 2 hours. The reaction mixture was subjected to condensation at the same temperature for 2 hours while removing the solvent, giving a solution A$_4$ containing a condensation silicone resin with a weight average molecular weight of about 27,000. The solution had a solids content of 72%.

PREPARATION EXAMPLE 5

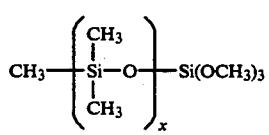
100 parts wherein x is an integer of about 10 on an average

| | |
|---|---|
| 0.1N aqueous solution of hydrochloric acid | 5.5 parts |
| Xylene | 50 parts |
| Methyl isobutyl ketone | 50 parts |

A mixture of the above components was reacted with stirring in a glass reactor at 83° C. for 3 hours. The reaction mixture was subjected to condensation at 120° C. for 2 hours while removing the solvent, giving a solution A$_5$ containing a condensation silicone resin about 20,000 in weight average molecular weight. The solution had a solids content of 69%.

PREPARATION OF MOISTURE-CURABLE FILM-FORMING RESIN SOLUTIONS

PREPARATION EXAMPLE 6

| | |
|---|---|
| γ-Methacryloyloxypropyl trimethoxysilane | 30 parts |
| n-Butyl acrylate | 20 parts |
| Methyl methacrylate | 50 parts |
| α,α'-Azobisisobutyronitrile | 1 part |

A glass reactor was charged with 30 parts of xylene, 30 parts of butyl acetate and 15 parts of n-butyl alcohol and the mixture was heated to 90° C. To the mixture maintained at 90° C. was added dropwise a mixture of the monomers and the catalyst as listed above by a dropping funnel over a period of 4 hours. After the addition, the mixture was heated to 110° C. To the mixture maintained at 110° C. was added dropwise a mixture of 10 parts of xylene, 10 parts of butyl acetate, 5 parts of n-butyl alcohol and 1 part of 2,2'-azobis-2,4-dimethylvaleronitrile by a dropping funnel over a period of 30 minutes. After completion of the addition, the mixture was maintained at 110° C. for 1 hour, giving a solution having a solids content of about 50% and containing an alkoxysilyl-containing acrylic resin with a weight average molecular weight of about 36,000. The resin contained about 130 silicon groups bonded to hydrolyzable groups per molecule.

PREPARATON EXAMPLE 7

| | |
|---|---|
| γ-Methacryloyloxypropyl methyldimethoxysilane | 50 parts |
| t-Butyl methacrylate | 40 parts |
| Lauryl acrylate | 10 parts |
| α,α'-Azobisisobutyronitrile | 0.9 part |

A glass reactor was charged with 38 parts of xylene and 37 parts of n-butyl alcohol and the mixture was heated to 90° C. To the mixture maintained at the same temperature was added dropwise a mixture of the monomers and the catalyst as listed above through a dropping funnel over a period of 4 hours. After the addition, the mixture was heated to 110° C. To the mixture maintained at 110° C. was added dropwise a mixture of 12 parts of xylene, 13 parts of n-butyl alcohol and 1 part of 2,2'-azobis-2,4-dimethylvaleronitrile over a period of 1 hour through a dropping funnel. After completion of the addition, the mixture was maintained at 110° C. for 30 minutes, giving a solution having a solids content of about 50% and containing an alkoxysilyl-containing acrylic resin with a weight average molecular weight of about 42,000. The resin contained about 270 silicon groups bonded to hydrolyzable groups per molecule.

PREPARATION EXAMPLE 8

| | |
|---|---|
| Allyl acrylate | 25 parts |
| Methyl methacrylate | 30 parts |
| n-Butyl acrylate | 45 parts |
| α,α'-Azobisisobutyronitrile | 1 part |

A 40 parts quantity of xylene and 40 parts of butyl acetate were placed into a glass reactor and the mixture was heated to 90° C. To the mixture maintained at the same temperature was added dropwise a mixture of the monomers and the catalyst as listed above through a dropping funnel over a period of 4 hours. After the addition, a mixture of 10 parts of xylene, 10 parts of butyl acetate and 1 part of 2,2'-azobis-2,4-dimethyl-valeronitrile was added dropwise to the reaction mixture maintained at 90° C. over a period of 30 minutes. After completion of the addition, the mixture was maintained at 90° C. for 1 hour, giving a solution containing an acrylic resin about 40,000 in weight average molecular weight.

Subsequently, the resin solution was kept at 80° C. To the solution was added dropwise a mixture of 0.4 part of platinum catalyst, 28 parts of trimethoxysilane and 28 parts of xylene over a 3-hour period. After the addition, the mixture was heated and maintained at 100° C. at which 0.1 part of platinum catalyst was added thereto, followed by 2 hours of reaction, giving a solution containing an alkoxysilyl group-containing acrylic resin and having a solids content of about 50%. The resin had about 210 silicon groups bonded to hydrolyzable groups in the molecule.

PREPARATION EXAMPLE 9

| | |
|---|---|
| Phthalic anhydride | 32.1 parts |
| Trimethylolpropane | 14.1 parts |
| Pentaerythritol | 14.5 parts |
| Fatty acid of soybean oil | 46.2 parts |

A mixture of the above components was placed into a glass reactor and heated with stirring. The mixture was heated and maintained at 180° C. for 1 hour to effect esterification. Then 5 parts of xylene was added and the mixture was heated to 230° C. While refluxing xylene at 230° C., the reaction proceeded for about 4 hours and was terminated when the acid value (calculated as solids) reached 15. After the reaction mixture was cooled, xylene was added thereto, giving a resin solution having a solids content of 50%. The resin thus obtained was about 23,000 in weight average molecular weight.

Thereafter the obtained resin solution was maintained at 80° C. and reacted with 27 parts of isocyanoethyl methacrylate until isocyanate group was substantially removed from the reaction system. To the reaction mixture maintained at 80° C. was added dropwise a mixture of 21.1 parts of trimethoxysilane, 0.15 part of platinum catalyst and 21 parts of xylene over a period of 3 hours. After the addition, the mixture was heated and maintained at 100° C. and 0.05 part of a platinum catalyst was added. The mixture was reacted for 2 hours, giving an alkoxysilyl-containing polyester resin solution. The resin contained about 120 silicon groups bonded to hydrolyzable groups per molecule. The solution had a solids content of 58%.

EXAMPLE 1

| | |
|---|---|
| Condensation silicone resin solution A₁ of Prep. Ex. 1 | 20 parts |
| Acrylic resin solution of Prep. Ex. 6 | 2 parts |
| Dimethylsiloxane of the formula (IV) (Note 1) | 2 parts |
| Silicone oil (Note 2) | 2.5 parts |
| Isooctane | 40 parts |
| Ethanol | 33.5 parts |

A container was charged with 100 parts of a mixture of the above components and 200 parts of LPG serving as a propellant and was hermetically sealed. The resulting composition was sprayed over an aluminum panel to form a film with a dry thickness of about 5 μm. The coated panel was left to stand for 24 hours at room temperature for drying and the dried panel was used for determining icing-strength. Table 2 shows the result.

(Note 1)
Dimethylsiloxane represented by the formula

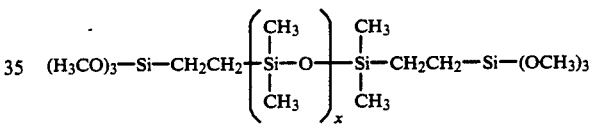

wherein x is an integer of about 5 on an average.

(Note 2)
A silicone oil represented by the formula

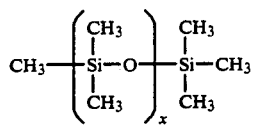

wherein x is an integer of about 8 on an average.

EXAMPLES 2 TO 9 AND COMPARISON EXAMPLE 1

Shear strength (kg/cm²) at an ice-substrate interface was determined in the same manner as in Example 1 with the exception of using the components as shown below in Table 1 in the listed amounts. Table 2 shows the results.

TABLE 1

| | Example | | | | | | | | Comp. Ex. |
|---|---|---|---|---|---|---|---|---|---|
| | 1 | 2 | 3 | 4 | 5 | 6 | 7 | 8 | 1 |
| Condensation silicone resin solution | | | | | | | | | |
| Kind (Prep. Ex. No.) | 1 | 2 | 1 | 3 | 4 | 1 | 5 | 2 | |
| Amount (part) | 20 | 19.5 | 1.5 | 1.5 | 2.3 | 15 | 7.1 | 5 | |
| Moisture-curable film-forming resin solution | | | | | | | | | |

TABLE 1-continued

|  | Example 1 | 2 | 3 | 4 | 5 | 6 | 7 | 8 | Comp. Ex. 1 |
|---|---|---|---|---|---|---|---|---|---|
| Kind (Prep. Ex. No.) | 6 | 7 | 7 | 7 | 6 |  | 8 | 9 |  |
| Amount (part) | 2 | 1.5 | 20 | 20 | 5 |  | 4.6 | 6 |  |
| Dimethylsiloxane of the formula (IV) |  |  |  |  |  |  |  |  |  |
| Kind (Note No.) | N1 | N3 | N1 |  |  |  |  | N1 |  |
| Amount (part) | 2 | 1 | 1 |  |  |  |  | 1 |  |
| Silicone oil |  |  |  |  |  |  |  |  |  |
| Kind (Note No.) | N2 | N4 | N2 | N2 | N4 |  |  | N4 | N5 |
| Amount (part) | 2.5 | 2 | 1 | 1 | 0.7 |  |  | 2.5 | 15 |
| Solvent (part) |  |  |  |  |  |  |  |  |  |
| Isooctane | 40 |  | 40 | 40 |  |  | 40 | 20.2 |  |
| Ethanol | 33.5 |  | 36.5 | 36.5 |  |  |  |  |  |
| Heptane |  | 35 |  |  | 35 |  | 13 |  |  |
| Butanol |  | 20 |  |  | 40 |  | 35.3 | 12 |  |
| Ethylene glycol monomethyl ether acetate |  | 21 |  |  |  |  |  | 10 |  |
| Methyl isobutyl ketone |  |  |  |  | 17 |  |  | 10 |  |
| Octane |  |  |  |  |  | 85 |  |  | 85 |
| Propellant (part) |  |  |  |  |  |  |  |  |  |
| LPG | 200 | 200 | 200 |  | 200 | 200 | 200 | 150 | 200 |
| Carbon dioxide gas |  |  |  | 200 |  |  |  | 50 |  |

The symbols N1 to N5 stand for (Note 1) to (Note 5), respectively.

TABLE 2

|  | Example 1 | 2 | 3 | 4 | 5 | 6 | 7 | 8 | Comp. Ex. 1 |
|---|---|---|---|---|---|---|---|---|---|
| Shear strength (kg/cm$^2$) (Note 6) Initial value | 0.08 | 0.18 | 0.18 | 0.15 | 0.20 | 0.05 | 0.05 | 0.24 | 0.95 |
| Repeat test (Note 7) |  |  |  |  |  |  |  |  |  |
| After 10 times | 0.21 | 0.23 | 0.27 | 0.25 | 0.23 | 0.59 | 0.41 | 0.39 | 3.20 |
| After 20 times | 0.24 | 0.36 | 0.28 | 0.26 | 0.25 | 1.23 | 0.49 | 0.51 | 4.73 |
| After 30 times | 0.38 | 0.47 | 0.30 | 0.27 | 0.28 | 1.98 | 0.53 | 0.81 | — |
| After 40 times | 0.40 | 0.69 | 0.40 | 0.38 | 0.36 | — | 0.79 | 0.87 | — |
| After 50 times | 0.43 | 0.83 | 0.48 | 0.41 | 0.45 | — | 0.93 | 0.99 | — |
| Outdoor exposure test (Note 8) |  |  |  |  |  |  |  |  |  |
| For 2 weeks | 0.45 | 0.56 | 0.45 | 0.41 | 0.35 | 0.91 | 0.38 | 0.48 | 5.75 |
| For 4 weeks | 0.57 | 0.78 | 0.55 | 0.43 | 0.58 | 1.89 | 0.48 | 0.51 | — |
| For 8 weeks | 0.78 | 0.91 | 0.70 | 0.59 | 0.88 | — | 0.76 | 0.87 | — |
| For 12 weeks | 0.93 | 1.11 | 0.78 | 0.74 | 0.99 | — | 1.12 | 1.39 | — |

In Table 1, (Note 3), (Note 4) and (Note 5) denote the following.

(Note 3)
Dimethylsiloxane represented by the formula

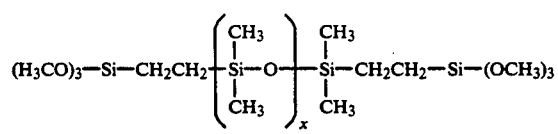

wherein x is an integer of about 20 on an average.

(Note 4)
A silicone oil represented by the formula

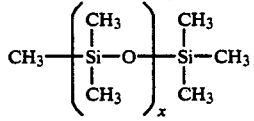

wherein x is an integer of about 200 on an average.

(Note 5)
A silicone oil represented by the formula

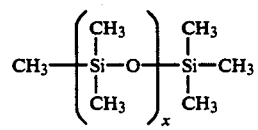

wherein x is an integer of about 1,000 on an average, the oil having a viscosity of about 1,000 St. (at 25° C.).

The tests for checking the properties as designated (Note 6), (Note 7) and (Note 8) in Table 2 were carried out by the following methods.

TEST METHODS

Note 6

Test method for determining the shear strength

A stainless steel ring (5 cm$^2$ in inner area) was placed on a test panel (an aluminum panel coated with the anti-icing coating composition for testing and then dried). The panel with the ring was introduced into a constant temperature bath for freezing test at −10° C. and precooled for 90 minutes. A 2 ml quantity of deionized water and maintained at 5° C. was poured into the inside of the ring to form ice on the coating surface on the panel which was then left to stand at $-10°$ C. for 2 hours. The panel with the ring attached thereto was connected to a load cell and force was applied to the ring by a powerdriven operating metal rod to measure the shear strength (unit: kg/cm$^2$) required in separating the ice from the coating.

Note 7

Repeat test

The test as described in (Note 6) was conducted repeatedly with the stainless steel ring placed in the same position on the test panel to measure the shear strength. Table 2 shows the results obtained each time when the test was repeated 10, 20, 30, 40 and 50 times, respectively.

Note 8

Test for determining the shear strength after outdoor exposure

Test panels were inclined at an angle of 35° and directed southward in Hiratsuka city, Kanagawa prefecture and subjected to outdoor exposure. The test as described in (Note 6) was conducted using four kinds of test panels each exposed to weather for 2, 4, 8 and 12 weeks, respectively.

The shear strength was also measured on test panels not subjected to the test as described in (Note 6).

Table 2 shows that ice was formed with low adhesion to the surface of the test panel coated with the anti-icing composition of the invention. The same effect was produced not only on the test panels coated with the anti-icing composition of the invention by aerosol application, but also on the test panels coated with the anti-icing composition of the invention free of a propellant by a brushing and air spray coating.

Moreover, the coating compositions obtained in other Examples than Example 6 and containing the moisturecurable film-forming resin sustained the anti-icing effect for a longer period of time than the composition of Example 6.

We claim:

1. An anti-icing composition comprising at least two resins, the first resin being a moisturecurable film-forming resin, and the second resin being a silicone resin which is at least one comb-shaped condensate having hydrophobic dimethylsiloxane chains as side chains, said condensate being selected from the group consisting of:
   (i) a condensate of an alkoxydimethylsiloxane compound represented by the formula

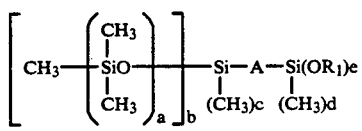

(I)

wherein R$_1$ is a methyl group or an ethyl group, A is an oxygen atom, an ethylene group or a 1,3-propylene group, a is an integer of 5 to 150, b is an integer of 1 to 3, e is an integer of 2 or 3, c is an integer of 3-b, and d is an integer of 3-e,
   (ii) a condensate of the compound of the formula (I) and an alkoxysilane compound represented by the formula $(R_3)h—Si—(OR_2)j$ (II)

wherein R$_2$ is a methyl group or an ethyl group, R$_3$ is an alkyl group having 1 to 8 carbon atoms, h is an integer of 0 to 3 and j is an integer of 4-h,
   (iii) a condensate of the compound of the formula (I) and a dihydroxydimethylsiloxane compound represented by the formula

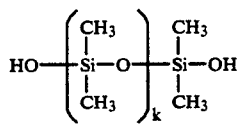

(III)

wherein k is an integer of 10 to 200, and
   (iv) a condensate of the compound of the formula (I), the alkoxysilane compound of the formula (II) and the dihydroxydimethylsiloxane compound of the formula (III), the amount of said first resin being at least 2% by weight, and the amount of said second resin being at most 98% by weight, based on the combined amount of the first and second resins.

2. An anti-icing composition according to claim 1 which comprises about 5 to about 95% by weight of the silicone resin and about 95 to about 5% by weight of the moisture-curable film-forming resin.

3. An anti-icing composition according to claim 1 wherein the moisture-curable film-forming resin is a resin having a silicon group represented by the formula

wherein R$_5$ is a hydrocarbon group of 1 to 10 carbon atoms selected form an alkyl group, an aryl group and an aralkyl group, Z is a hydrolyzable group selected from a halogen atom, an alkoxy group, an acyloxy group, a phenoxy group and a thioalkoxy group and ti is an integer of 1 to 3, the resin having per molecule at least one silicon group attached to the hydrolyzable group at the terminal or side chain.

4. An anti-icing composition according to claim 1 which contains a dimethylsiloxane compound having alkoxysilyl groups at both terminals and represented by the formula

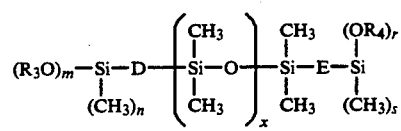

(IV)

wherein R$_3$ and R$_4$ are the same or different and each represent a methyl group or an ethyl group, D and E are the same or different and each represent an oxygen atom, an ethylene group or a 1,3-propylene group, X is an integer of 3 to 30, m and r are the same or different and each represent an integer of 1 to 3, n is 3-m and S is 3-r.

5. An anti-icing composition according to claim 1 which contains a silicone oil represented by the formula

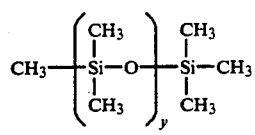 (V)
wherein y is an integer of 1 to 20,000.
6. An anti-icing method comprising applying an aerosol containing the anti-icing composition as defined in claim 1 and a propellant.
7. An anti-icing composition according to claim 1, wherein A of the formula (I) is an ethylene group.
* * * * *